(12) United States Patent
Oshima et al.

(10) Patent No.: US 10,252,319 B2
(45) Date of Patent: Apr. 9, 2019

(54) METHOD FOR PRODUCTION OF TWO-PIECE CAN

(71) Applicant: JFE Steel Corporation, Tokyo (JP)

(72) Inventors: Yasuhide Oshima, Tokyo (JP); Junichi Kitagawa, Tokyo (JP); Hiroki Iwasa, Tokyo (JP); Katsumi Kojima, Tokyo (JP); Hiroshi Kubo, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 352 days.

(21) Appl. No.: 15/158,897

(22) Filed: May 19, 2016

(65) Prior Publication Data

US 2016/0263644 A1 Sep. 15, 2016

Related U.S. Application Data

(62) Division of application No. 12/522,982, filed as application No. PCT/JP2008/051025 on Jan. 18, 2008, now abandoned.

(30) Foreign Application Priority Data

Feb. 6, 2007 (JP) ................................ 2007-026651

(51) Int. Cl.
*B21D 51/26* (2006.01)
*B32B 27/36* (2006.01)
*B32B 15/09* (2006.01)
*B32B 15/18* (2006.01)

(52) U.S. Cl.
CPC ......... *B21D 51/2615* (2013.01); *B21D 51/26* (2013.01); *B32B 15/09* (2013.01);
(Continued)

(58) Field of Classification Search
CPC ................ B21D 51/26; B21D 51/2615; B21D 51/2646; B21D 22/28; B32B 15/09; B32B 15/18; B32B 2307/538; B32B 2439/66
See application file for complete search history.

(56) References Cited

U.S. PATENT DOCUMENTS 4,441,354 A * 4/1984 Bodega ................. B21D 22/28
72/342.1
5,072,605 A * 12/1991 Imazu .................... B21D 51/26
72/347

(Continued)

FOREIGN PATENT DOCUMENTS

JP 03-098844 4/1991
JP 04-091825 3/1992
(Continued)

OTHER PUBLICATIONS

International Search Report—PCT/JP2008/051025—dated May 1, 2008.
European Office Action dated Aug. 29, 2016; Application No. 08 703 852.7.

*Primary Examiner* — Edward Tolan
(74) *Attorney, Agent, or Firm* — Young & Thompson

(57) ABSTRACT

A laminated steel sheet for a two-piece can body with a high strain level satisfying the following formulae, the polyester resin layer composing the laminated steel sheet having a center line surface roughness (Ra) of 0.2 μm to 1.8 μm:

$r_1 \leq r, 0.1 \leq r_1/R \leq 0.25$, and $1.5 \leq h/(R-r) \leq 4$ wherein h is the height of the two-piece can body, r is the maximum radius, $r_1$ is the minimum radius, and R is the radius of the circular laminated steel sheet before forming having the same weight as the can body.

22 Claims, 1 Drawing Sheet

(52) U.S. Cl.
CPC .............. *B32B 15/18* (2013.01); *B32B 27/36* (2013.01); *B32B 2255/06* (2013.01); *B32B 2255/20* (2013.01); *B32B 2255/205* (2013.01); *B32B 2307/406* (2013.01); *B32B 2307/50* (2013.01); *B32B 2307/538* (2013.01); *B32B 2307/584* (2013.01); *B32B 2307/714* (2013.01); *B32B 2439/66* (2013.01); *Y10T 428/1355* (2015.01)

(56) References Cited

U.S. PATENT DOCUMENTS

| | | | | |
|---|---|---|---|---|
| 5,105,645 | A * | 4/1992 | Kobayashi | B21D 51/26 72/348 |
| 5,179,854 | A * | 1/1993 | Matsui | B21D 22/28 72/349 |
| 5,249,447 | A * | 10/1993 | Aizawa | B21D 22/201 72/349 |
| 5,557,963 | A * | 9/1996 | Diekhoff | B21D 51/2615 72/356 |
| 5,724,848 | A * | 3/1998 | Aschberger | B21D 51/2615 413/69 |
| 5,753,328 | A | 5/1998 | Miyazawa et al. | |
| 6,164,785 | A * | 12/2000 | Maekawa | G02B 1/11 359/601 |
| 7,726,165 | B2 * | 6/2010 | Myers | B21D 51/2638 72/348 |
| 8,365,670 | B2 * | 2/2013 | Abramov | F42B 12/24 102/482 |
| 2005/0191483 | A1 | 9/2005 | Yoshida et al. | |
| 2005/0238845 | A1 | 10/2005 | Kuroda et al. | |
| 2007/0267423 | A1 | 11/2007 | Kubo et al. | |
| 2009/0217729 | A1 * | 9/2009 | Kojima | B21D 51/26 72/349 |

FOREIGN PATENT DOCUMENTS

| | | |
|---|---|---|
| JP | 10-315389 | 12/1998 |
| JP | 2005-161785 | 6/2005 |

* cited by examiner

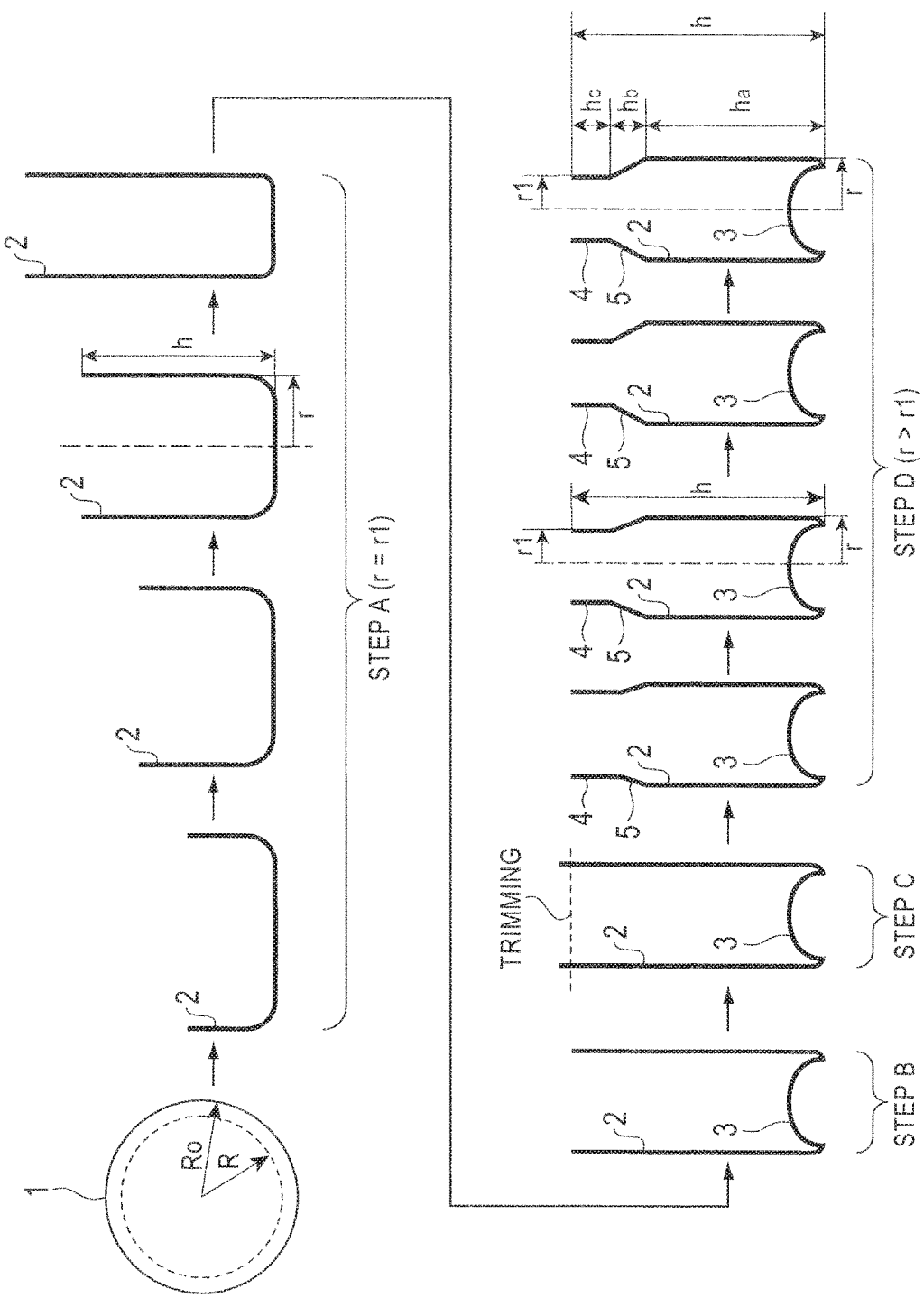

METHOD FOR PRODUCTION OF TWO-PIECE CAN

TECHNICAL FIELD

The present invention relates to a laminated steel sheet for a two-piece can body, a method for making a two-piece can body, and a two-piece can body made of the laminated steel sheet, and specifically to a laminated steel sheet for making a two-piece can body having a high strain level such as those for containing aerosols, a method for making a two-piece can body, and a two-piece can body made of the laminated steel sheet.

BACKGROUND ART

Metal cans are broadly divided into two-piece and three-piece cans. A two-piece can is made of two sections, namely a can end and a can body integrated with a can bottom. A three-piece can is made of three sections, namely a can body, a can end, and a can bottom. A two-piece can body has no seam (weld) and thus looks good, but is usually required to endure a high strain level. A three-piece can has seams in its can body and thus is inferior to a two-piece can in the appearance, but is usually not required to endure a high strain level. Therefore, in the market, two-piece cans are often used for containing low volumes of quality products, and three-piece cans are often used for high volumes of low-priced products.

Of two-piece cans, those for containing aerosols are highly strained by drawing, and elongated in the height direction (hereinafter may be referred simply as "have a high strain level"). Two-piece can bodies are usually made of a thick and expensive aluminum sheet, and are rarely made of a thin and low-cost tin or tin-free steel sheet. The reason for this is that a steel sheet is not suitable for making a two-piece can body for containing an aerosol which is produced through drawing or DI processing at high strain levels, while a soft metal material such as an aluminum endures impact forming.

Under the above-described circumstances, production of a two-piece can body with a high strain level from a thin, low-cost, and high-strength tin or tin-free steel sheet will be industrially meaningful.

In the prior art, common two-piece cans with a low strain level are produced from a resin-laminated steel sheet (hereinafter referred to simply as "laminated steel sheet") through drawing or DI processing. Laminated steel sheets used to make two-piece cans with a low strain level are commonly coated with a polyester. Typical examples of the coating include ionomer compounds composed mainly of polyethylene terephthalate, polyethylene terephthalate-isophthalate copolymer, polyethylene terephthalate-polybutylene terephthalate copolymer, or saturated polyester.

These laminated steel sheets are designed according to the methods for making two-piece cans with a low strain level, and are suitable for such applications. However, there has been no study on the use of the laminated steel sheet for the production of a can body produced through drawing and subsequent diametral reduction with a high strain level, such as a two-piece can for containing an aerosol.

Patent Documents 1 to 3 disclose a method for drawing a resin-coated metal sheet and a method for DI processing. However, all the techniques are aimed at can bodies with a low strain level, such as those for containing beverages and foods. Specifically, these documents disclose a technique for relaxing the internal stress, which has been caused by processing during the manufacture of a two-piece can with a low strain level, through heat treatment after the processing, and a technique for promoting the orientation of the resin. Patent Documents 2 and 3 disclose performance of heat treatment at the intermediate or final step thereby preventing the delamination of the resin layer and improving the barrier properties after the processing. More specifically, Patent Document 2 suggests heat treatment of an orientational thermoplastic resin for the relaxation of internal stress and the promotion of orientational crystallization. The procedure of the heat treatment is commonly used for producing beverage cans. According to Patent Document 2, the heat treatment is given to a cup after redrawing, and is preferably carried out at a temperature 5° C. lower than the melting point of the coating resin thereby thoroughly promoting the crystallization. However, the examples of the invention imply that the invention is applicable only to can bodies with a low strain level. The examples of Patent Document 3 disclose a method including forming a coating layer composed of a saturated polyester and an ionomer compound, followed by DI processing. Patent Document 3 provides a method including heat treatment after drawing, followed by DI processing, necking, and flanging. However, as is the case with Patent Document 2, the examples of the invention imply that the invention is applicable only to can bodies with a low strain level.

Patent Documents 4 and 5 describe methods including heat treatment of a formed can at a temperature not lower than the melting point of the resin thereby relaxing the internal stress. However, according to the main text and examples of the description, the strain level of the can body thus obtained is still low.

Patent Document 1: Japanese Examined Patent Application Publication No. 7-106394

Patent Document 2: Japanese Patent No. 2526725

Patent Document 3: Japanese Unexamined Patent Application Publication No. 2004-148324

Patent Document 4: Japanese Examined Patent Application Publication No. 59-35344

Patent Document 5: Japanese Examined Patent Application Publication No. 61-22626

More specifically there has been no disclosed method for producing a two-piece can body with a high strain level, such as those for containing an aerosol, from a laminated steel sheet. The inventors had attempted to make a two-piece can body with a high strain level through the steps of forming a circular laminated steel sheet into a bottomed tube by DI processing, and then reducing the diameter of the vicinity of the opening. As a result of this, the resin layer caused delamination and fracture. Since these problems are incident to forming at a high strain level, the inventors thought that heat treatment was effective for solving these problems. However, it is known that these problems cannot be sufficiently solved by heat treatment before or after the forming, and delamination of the resin layer cannot be avoided at such a high strain level. Therefore, the delamination of the resin layer during the production of a two-piece can body with a high strain level cannot be prevented by the simple use of the prior art. In addition, the processability of the resin layer deteriorated during or after the heat treatment.

Disclosure of Invention

The present invention is intended to provide a laminated steel sheet suitable for a two-piece can body which will not cause delamination or fracture of the resin layer, a method for making a two-piece can body, and a two-piece can body made of the laminated steel sheet.

During processing of a two-piece can having a high strain level, the resin layer must have processability conformable to a high strain level. Although many resins with high processability have been studied, there are few studies from the viewpoint of the shape of the resin surface. In order to increase the number of the bumps on the resin surface thereby improving processability, attempts have been made to add small particles such as silica particles, which are usually called a lubricant, to a resin layer thereby reducing the surface friction with a processing die to improve the processability. The inventors found that large bumps are formed on a surface of a smooth resin film during lamination of the film using a lamination roll, and further discussed the finding. Consequently, the inventors have found that the processability of a film is markedly improved through the formation of large bumps on the resin film surface. Details are described below.

Common lubricants used for reducing the surface friction have a size of 1 μm or less. Such a lubricant forms very fine surface bumps on a resin layer. On the other hand, using a lamination roll, bumps having a size corresponding to the surface shape of the lamination roll can be formed in the film surface direction under the control of the surface shape of the lamination roll, and temperature and pressure during lamination.

For example, when a common rubber roll having a surface roughness (Ra) of 0.5 μm is used for lamination, bumps of several tens to hundreds of nanometers are formed in the film surface direction. In addition, the surface roughness can be controlled within a range of 0.2 to 1.8 in terms of the center line surface roughness (Ra). As a result of research, it has been found that a laminated steel sheet with bumps on its surface exhibits a markedly reduced surface friction, which results in the reduction of the processing stress and marked improvement of the processability.

A laminated steel sheet having the surface shape will not cause delamination or fracture even subjected to forming at a high strain level to make a two-piece aerosol can or the like. The laminated steel sheet favorably restored its adhesion through the heat treatment following the processing, indicating that it provides good film adhesion in the form of a can. The heat treatment temperature for sufficiently recovering the adhesion was lower and the heat treatment time was shorter in comparison with the case using a resin having a lower copolymerization ratio. In addition, crystallization hardly occurred during cooling, suggesting that sufficient performance is maintained even at a low cooling rate.

The present invention has been accomplished on the basis of the findings, and the aspects thereof are described below.

[1] A laminated steel sheet for a two-piece can body satisfying the following formulae, the laminated steel sheet having a polyester resin layer on at least one side, and the surface of the polyester resin layer having a center line surface roughness Ra of 0.2 μm to 1.8 μm:

$$r_1 \leq r, 0.1 \leq r_1/R \leq 0.25, \text{ and } 1.5 \leq h/(R-r) \leq 4$$

wherein h is the height of the two-piece can body, r is the maximum radius, $r_1$ is the minimum radius, and R is the radius of the circular laminated steel sheet before forming having the same weight as the can body.

[2] The laminated steel sheet for a two-piece can body according to [1], wherein the surface of the polyester resin layer has a 60 degree glossiness of 30 to 100.

[3] The laminated steel sheet for a two-piece can body according to [1], wherein the polyester resin layer is formed by the condensation polymerization of a dicarboxylic acid component composed mainly of terephthalic acid with a diol component composed mainly of ethylene glycol, the dicarboxylic acid component contains from 8 to 20 mol % of an isophthalic acid component as the copolymerization component, the polyester resin layer has a plane orientation factor of 0.04 or less and a crystallization temperature of 140 to 160° C.

[4] The laminated steel sheet for a two-piece can body according to [1], wherein the surface of the polyester resin layer has a center line surface roughness Ra of 0.2 μm to 1.0 μm.

[5] The laminated steel sheet for a two-piece can body according to [1], wherein the surface of the polyester resin layer has a center line surface roughness Ra of 0.4 μm to 1.8 μm.

[6] The laminated steel sheet for a two-piece can body according to [5], wherein the surface of the polyester resin layer has a center line surface roughness Ra of 0.4 μm to 1.0 μm.

[7] A method for making a two-piece can body, including multistep forming of a circular blank made of the laminated steel sheet for a two-piece can body according to [1], thereby obtaining a formed body satisfying the following formulae:

$$r_1 \leq r, 0.1 \leq r_1/R \leq 0.25, \text{ and } 1.5 \leq h/(R-r) \leq 4$$

wherein h is the height of the two-piece can body, r is the maximum radius, $r_1$ is the minimum radius, and R is the radius of the circular laminated steel sheet before forming having the same weight as the can body.

[8] The method for making a two-piece can body according to [7], which further includes heat treatment at a temperature of 150° C. to 220° C. during the forming step.

[9] The method for making a two-piece can body according to [8], wherein the heat treatment is carried out during the forming step so as to satisfy the following formulae:

$$r_1 \leq r, 0.2 \leq r_1/R \leq 0.5, \text{ and } 1.5 \leq h/(R-r) \leq 2.5$$

wherein h is the height of the two-piece can body, r is the maximum radius, $r_1$ is the minimum radius, and R is the radius of the circular laminated steel sheet before forming having the same weight as the can body.

[10] The method for making a two-piece can body according to [8], wherein the heat treatment is carried out several times.

[11] A two-piece can body produced by the method according to [7].

BRIEF DESCRIPTION OF THE DRAWINGS

FIG. 1 shows an embodiment of the manufacturing process of the two-piece can body of the present invention. Reference numerals in FIG. 1 indicate the following:
1 circular blank
2 straight wall
3 domed section
4 neck
5 tapered section

MODE FOR CARRYING OUT THE INVENTION

The present invention is further described below in more detail.

The present invention is applicable to two-piece cans, and is particularly suitable for two-piece cans with a high strain level, such as those for containing an aerosol. A two-piece can according to the present invention is described below.

FIG. 1 shows an embodiment of the manufacturing process of the two-piece can body of the present invention. In FIG. 1, a circular blank 1 composed of a resin-laminated steel sheet is subjected to drawing (including DI processing) to be formed into a bottomed tube, and the vicinity of the opening of the formed body is subjected to diametral reduction thereby producing a two-piece can body with a reduced diameter opening. In the present invention, the term "circular" refers to a shape suitable for drawing, DI processing, diametral reduction, and/or flanging, and is not limited to a particular shape. Accordingly, the resin-laminated steel sheet used to make a can body may be circular, almost circular, distorted circular, or elliptical.

In FIG. 1, reference numeral 1 indicates a circular blank (blank sheet) before forming, reference numeral 2 indicates a straight wall (or a straight wall with an unreduced diameter in step D), reference numeral 3 indicates a domed section, reference numeral 4 indicates a neck having a straight wall with a reduced diameter, and reference numeral 5 indicates a tapered wall having a reduced diameter.

As shown in FIG. 1, firstly, the circular blank 1 is subjected to one-step or multistep drawing (including DI processing) to be formed into a bottomed tube having a predetermined radius (r: radius of the outside of the can body) (step A). Secondly, the bottom of the formed body is domed thereby forming the domed section 3 (step B). Subsequently, the opening of the formed body is trimmed at its edge (step C). Then, the opening of the formed body is subjected to one-step or multistep diametral reduction thereby reducing the radius of the opening side of the formed body to a predetermined value ($r_1$: radius of the outside of the can body), and thus obtaining an intended final formed body (two-piece can body) (step D). In FIG. 1, $R_0$ indicates the radius of the circular blank 1 before forming (or the average of the major and minor axes of an ellipse), h, r, and $r_1$ represent the height, maximum radius, and minimum radius of the intermediate or final formed body, respectively, and R is the radius of the circular blank before forming having the same weight as the final formed body.

More specifically, in the manufacturing process of the two-piece can body of the present invention, the maximum radius r is equal to the minimum radius $r_1$, or $r=r_1$ in the step A, and $r>r_1$ in the step D.

$R_0$ is the sum of R, which is calculated from the final formed body, and the margin to be trimmed. $R_0$ may be an optional value, but is preferably smaller from an industrial viewpoint because the margin to be trimmed will be waste. $R_0$ is usually 10% or less of R, and up to 20% or less of R. In many cases, $R_0$ is 1 to 1.1 times, up to 1 to 1.2 times larger than R. Therefore, in an embodiment of the present invention, for example, the timing of heat treatment at the intermediate stage may be determined under a condition that $R=R_0/1.05$. When a plurality of can bodies are produced, R may be determined using a prototype.

The radius R of the circular blank before forming having the same weight as the final formed body is determined on the basis of the measured weight of the final formed body. More specifically, the weight of the final formed body is measured, and the size (radius) of the circular laminated steel sheet before forming having a weight the same as the measured weight is calculated, and used as the radius R of the circular blank before forming having the same weight as the final formed body. Although the can edge is trimmed during the manufacturing process of the can body, the radius R of the circular blank before forming having the same weight as the final formed body is not influenced by the trimming, which allows more accurate evaluation of the strain level.

As described above, during the production of a two-piece can including drawing (including DI processing) of a circular blank made of a resin-laminated steel sheet followed by diametral reduction, the resin layer is elongated in the height direction, and shrunk in the circumferential direction. When the strain level is high, the resin is markedly deformed, which result in fracturing of the resin layer. Therefore, in the present invention, the parameter $r_1/R$ defining the degree of shrinkage and the parameter $h/(R-r)$ defining the degree of elongation in the can height direction are used as the indexes of the strain level. The reason for this is that the drawing ratio and the amount of elongation must be taken in consideration to define the strain level of a two-piece can body with a high strain level. More specifically, the degree of deformation of the resin layer is quantified by defining the strain level on the basis of the degree of shrinkage and the degree of elongation. When the resin layer is elongated in the height direction and shrunk in the circumferential direction, it readily causes delamination. Therefore, the amount of elongation in the height direction is also an important factor as well as the degree of shrinkage.

On the basis of the above-described results, the present invention defines that the strain level of the final can body (final formed body) satisfies $0.1 \leq r_1/R \leq 0.25$ and $1.5 \leq h/(R-r) \leq 4$, wherein h is the height of the final formed body, r is the maximum radius, $r_1$ is the minimum radius, and R is the radius of the circular blank before forming having the same weight as the final formed body.

As described above, the present invention is aimed at producing a two-piece can body with a high strain level from a laminated steel sheet, which is difficult with the prior art. With the prior art, it is difficult to produce a two-piece can body with a high strain level from a laminated steel sheet so as to satisfy $r_1/R \leq 0.25$ and $1.5 \leq h/(R-r)$, wherein $r_1/R$ is the parameter defining the degree of shrinkage, and $h/(R-r)$ is the parameter defining the degree of elongation. Therefore, according to the present invention, the strain level of the two-piece can body is defined so as to satisfy $r_1/R \leq 0.25$ and $1.5 \leq h/(R-r)$.

On the other hand, if the parameter $r_1/R$ defining the degree of shrinkage is less than 0.1, or the parameter $h/(R-r)$ defining the degree of elongation is more than 4, the strain level is so high that the number of steps to obtain a formed body may be redundantly increased, or the sheet may reach the elongation limit along with work hardening, which may result in fracturing of the sheet. Accordingly, in the present invention, the strain level of the intended two-piece can body is defined so as to satisfy $0.1 \leq r_1/R$ and $h/(R-r) \leq 4$.

Accordingly, the two-piece can body of the present invention satisfies the following formulae:

$$r_1 \leq r, 0.1 \leq r_1/R \leq 0.25, \text{ and } 1.5 \leq h/(R-r) \leq 4$$

wherein h is the height of the two-piece can body, r is the maximum radius, $r_1$ is the minimum radius, and R is the radius of the circular laminated steel sheet before forming having the same weight as the can body.

The multistep forming in the present invention refers to drawing, DI processing, and/or diametral reduction. When diametral reduction is carried out, $r_1$ of the final formed body satisfies $r>r_1$. When no diametral reduction is carried out, $r_1$ of the final formed body satisfies $r=r_1$, wherein r and $r_1$ are the radii of the final formed body.

The metal sheet used as the substrate of the laminated steel sheet of the present invention is further described below. The metal sheet used as the substrate of the laminated steel sheet of the present invention is a steel sheet. Therefore, it is less expensive than aluminum, and thus improves cost efficiency. Examples of preferred steel sheets include common tin-free steel sheets and tinplates. The tin-free steel sheet preferably has on its surface, for example, a metal chromium layer in a coating weight of 50 to 200 mg/m$^2$, and a chromium oxide layer in a coating weight of 3 to 30 mg/m$^2$ in terms of metal chromium. The tinplate preferably has a coating quantity of 0.5 to 15 g/m$^2$. The sheet thickness is not particularly limited, but is preferably from 0.15 to 0.30 mm. If the cost efficiency is not taken into consideration, the present invention may be applied to aluminum materials.

The resin layer composing the laminated steel sheet of the present invention is further described below. In the forming of a two-piece can body with a high strain level, the surface friction is markedly influential during processing. In usual cases, the smaller the surface friction, the higher the processability. In consideration of this, attempts have been made to form bumps on the resin surface. For example, fine particles may be added to a resin so as to be exposed at the resin surface, thereby increasing the surface roughness to improve the processability. However, as a result of research by the inventors, it has been found that the formation of bumps on a smooth resin film during lamination markedly reduces the surface friction, which results in the reduction of the processing stress and marked improvement of the processability.

Therefore, in the present invention, the center line surface roughness (hereinafter may be referred to as surface roughness) of the surface bumps of the resin layer is defined as 0.2 µm to 1.8 µm. In usual cases, beverage cans are required to have a high glossiness, so that the laminated metal sheet used to make the can is designed to have a smooth surface. A film used to make such a high gloss laminated metal sheet usually has a surface roughness Ra of 0.1 µm or less. The film surface keeps smoothness even after lamination, and has a surface roughness of about 0.1 µm. On the other hand, when the resin layer has a surface roughness greater than 0.2 µm, the processability improves. The higher the surface roughness, the higher the processability. The surface roughness is more preferably 0.4 µm or more. If the surface roughness exceeds 1.8 µm, the film has a nonuniform thickness, which tends to result in film defects. Therefore, the upper limit of the surface roughness is defined as 1.8 µm, and is more preferably 1.0 µm or less.

The surface roughness of the resin layer (film) can be controlled by changing the surface shape of the lamination roll, and the temperature and pressure during lamination. The surface roughness of the resin layer increases as the surface roughness of the lamination roll and the temperature and pressure during lamination increase. In particular, the lamination temperature is markedly influential, so that the surface roughness of the resin layer increases when the lamination temperature is near the melting point of the resin film. In addition, the surface roughness increases as the surface temperature of the lamination roll increases.

When the surface roughness of the resin film is controlled by the lamination temperature, the lamination temperature is preferably in the range of (resin melting point−8° C.) to (resin melting point+12° C.). If the lamination temperature is below (resin melting point−8° C.), the surface roughness is insufficient, and if higher than (resin melting point+12° C.), the surface is too rough and the film has a nonuniform thickness, which tend to result in film defects and sticking of the molten resin film to the lamination roll.

The surface of a resin film layer having the above-described surface roughness is a mat surface with a low glossiness. The surface preferably has a 60 degree glossiness of 30 to 100. The lower the glossiness, the higher the surface roughness and processability, but a glossiness lower than 30 may result in excessive surface roughness and uneven film thickness. The glossiness is preferably 50 or more. On the other hand, if the glossiness is higher than 100, the surface roughness is small and the improvement of processability may not be expected.

The resin layer included in the laminated steel sheet of the present invention is composed basically of a polyester resin. The dicarboxylic acid component of the polyester resin is composed mainly of terephthalic acid, and the diol component is composed mainly of ethylene glycol. In order to strike a balance between the processability and strength of the polyester resin layer, the resin layer preferably contains, as the copolymerization component, from 8 to 20 mol % of an isophthalic acid component. The plane orientation factor is preferably 0.04 or less, and the crystallization temperature is preferably from 140° C. to 160° C.

If the proportion of the copolymerization component is low, the molecules are readily oriented, which tends to result in delamination of the film or cracks (fractures) parallel to the can height direction as the increase of the strain level. The orientation proceeds also during the heat treatment of the formed can body. In order to avoid a problem, in the present invention, the preferred lower limit of the copolymerization component content is defined as 8 mol %. From the viewpoint of difficulty in orientation, the proportion of the copolymerization component is preferably higher. However, if the proportion exceeds 20 mol %, the cost of the film increases to deteriorate the cost efficiency, and the film becomes so soft that it may have poor scratch resistance and chemical resistance. Accordingly, the preferred upper limit of the copolymerization component content is defined as 20 mol %.

The crystallization temperature of the polyester resin is preferably from 140° C. to 160° C. If the crystallization temperature is lower than 140° C., the resin readily crystallizes, which may result in cracks or pinholes in the resin film having a high strain level. On the other hand, if the crystallization temperature is higher than 160° C., crystallization proceeds so slowly that the resin insufficiently crystallizes even if subjected to heat treatment at 150° C. or higher, which may result in the deterioration of the film strength or durability.

Further, the initial orientated state of the resin layer of the laminated steel sheet is also important for the resin layer to conform to the forming of the two-piece can body with a high strain level to which the present invention is applicable. A film produced by biaxial stretching is orientated in a plane in the stretching direction. If the degree of orientation is high after lamination, the film cannot conform to the processing, and may be fractured. From this viewpoint, the plane orientation factor is preferably 0.04 or less. In order to make a desired laminated steel sheet using a biaxial oriented film having a plane orientation factor of 0.08 to 0.15, the temperature during lamination is thoroughly increased thereby fusing the orientated crystals. A film produced by extrusion is substantially non-oriented, so that is preferred from the above-described viewpoint. In addition, direct lamination for laminating a molten resin directly to a steel sheet is preferred for the same reason.

The laminated steel sheet of the present invention is further described below.

The laminated steel sheet of the present invention is composed of the above-described metal sheet having a polyester resin layer on at least one side of the metal sheet. The laminated steel sheet defined in the present invention may contain additives such as a pigment, a lubricant, or a stabilizer in the resin layer. In addition to the resin layer defined in the present invention, another resin layer having another function may be provided over the above-described resin layer or between the resin layer and the steel substrate.

When the resin layer has a small thickness, the processability deteriorates. However, the resin layer defined in the present invention may have a small thickness to achieve a favorable result. The resin thickness may be appropriately selected according to the degree of processing and other required properties. For example, the thickness is preferably from 5 μm to 50 μm, and particularly 30 μm or less to fully derive the advantages of the present invention.

The method for laminating the resin to the steel sheet is not particularly limited, and may be selected from appropriate methods such as biaxial drawing, heat lamination for thermally bonding a non-oriented film under pressure, and extrusion for forming a resin layer directly on a steel sheet using a T die. These methods are known to be sufficiently effective.

The two-piece can body of the present invention is further described below.

The two-piece can body of the present invention is produced through multistep forming of a circular blank made of the above-described laminated steel sheet so as to satisfy the following formulae:

$$R_1 \leq r; 0.1 \leq r_1/R \leq 0.25, \text{ and } 1.5 \leq h/(R-r) \leq 4$$

wherein h is the height of the two-piece can body, r is the maximum radius, $r_1$ is the minimum radius, and R is the radius of the circular laminated steel sheet before forming having the same weight as the can body.

The two-piece can body with a high strain level defined in the present invention may cause delamination during forming depending on the processing conditions and resin type. Therefore, sufficient adhesion must be achieved according to the intended use and specifications of the can body. In order to achieve this, it is effective to subject the intermediate formed body to heat treatment at least once thereby heating the formed body to a temperature of 150° C. to 220° C.

The heat treatment is carried out to relax the internal stress caused by processing. The relaxation of the internal stress improves the adhesion. The can body with a high strain level described in the present invention is markedly strained in its resin layer, which tends to cause a great internal stress, and the internal stress may result in the delamination of the resin layer. The heat treatment relaxes the internal stress to suppress the decrease of the adhesion, thereby preventing the delamination. However, on the other hand, the heat treatment promotes the orientational crystallization of the resin, which results in the deterioration of the processability of the resin layer. In particular, in order to achieve the high strain level defined in the present invention, processing may be necessary even after the heat treatment, which can result in the deterioration of the processability due to orientational crystallization. It is thus preferred that the orientational crystallization be controlled. In order to control the orientational crystallization, in the present invention, preferred conditions and timing of the heat treatment are specified. In the present invention, the heat treatment is preferably carried out so as to heat the intermediate formed body to a temperature of 150° C. to 220° C. As described above, the orientational crystallization during the heat treatment can be controlled through the use of a resin which is hard to orient. The lower limit of the copolymerization ratio is defined in consideration of this. In addition, the use of the resin allows flowing of the resin at low temperatures, thereby allowing the heat treatment at a temperature markedly lower than the melting point (258° C.) of a polyethylene terephthalate resin. The time necessary for the heat treatment is short.

The heat treatment temperature is preferably lower than the melting point of the polyester resin thereby facilitating the maintenance of the good appearance of the surface layer, and the prevention of sticking of the resin to surrounding objects. Therefore, the upper limit of the heat treatment temperature is preferably 220° C. The lower limit of the heat treatment temperature is defined in consideration of the efficiency of the relaxation of the internal stress. The relaxation of the internal stress readily proceeds at a temperature not lower than the glass transition point (Tg) of the polyester resin. In manufacturing processes wherein the processing time does not matter, the heat treatment temperature may be selected within a range from the glass transition point (Tg) to 150° C., but the productivity tends to deteriorate under such conditions. From this viewpoint, the lower limit of the heat treatment temperature is preferably 150° C., and more preferably 170° C. or higher and not higher than the melting point of the polyester resin. If the processing time influences the deterioration of the productivity, the heat treatment temperature is preferably 170° C. or higher.

When a two-piece can body with a high strain level is formed, processing may be necessary after the heat treatment. In this case, the timing of the heat treatment must be appropriate.

The heat treatment is preferably carried out during forming so as to satisfy $0.2 \leq r_1/R \leq 0.5$ and $1.5 \leq h/(R-r) \leq 2.5$, wherein h is the height of the intermediate formed body, r is the maximum radius, $r_1$ is the minimum radius (r and $r_1$ may be equal), and R is the radius of the circular blank before drawing corresponding to the edge of the opening of the final formed body.

The reason for this is that the heat treatment achieves the best effect when the strain level satisfies the above-described ranges. If the heat treatment is carried out at a moderate strain level, the internal stress of the resin relaxes before it becomes high enough, so that the heat treatment is not so effective. On the other hand, if the heat treatment is carried out at a too high strain level, delamination occurs due to the deterioration of the resin adhesion, and the adhesion may not be sufficiently recover. In consideration of this, the upper and lower limits of the strain level during the heat treatment were defined as described above as indexes of the preferred timing of the heat treatment.

After the heat treatment, a crystalline resin such as a polyester resin is preferably cooled as soon as possible thereby preventing crystallization which deteriorates the processability. However, since the polyester resin of the present invention is crystallized at a sufficiently low rate, it may achieve sufficient performance even at a low cooling rate. When the proportion of the copolymerization component is low, the resin must be cooled at such a rate as to be cooled, for example, to its glass transition temperature within 10 seconds after the heat treatment. However, in the present invention, sufficient performance will be achieved even if the cooling takes about 30 seconds.

The method for the heat treatment is not particularly limited. It has been confirmed that equal results will be achieved by, for example, an electric furnace, a gas oven, an infrared furnace, and an induction heater. The heating rate, heating time, and cooling time (the time necessary for the resin to be cooled to a temperature not higher than the glass transition point of the resin after the completion of the heat treatment) may be appropriately selected in consideration of the advantages from the relaxation of the internal stress and disadvantages from the crystallization. In usual cases, the efficiency increases as the heating rate increases. The heating time is usually from 15 seconds to 60 seconds, but the invention is not limited to this range. The cooling rate is preferably higher thereby preventing the occurrence of spherocrystals.

EXAMPLE 1

The examples of the present invention are described below.

"Making of Laminated Steel Sheet"

A tin-free T4CA steel sheet (metal Cr layer: 120 mg/m$^2$, Cr oxide layer: 10 mg/m$^2$ in terms of metal Cr) having a thickness of 0.20 mm was used as the substrate. The substrate was subjected to film lamination (film heat lamination) or direct lamination (direct extrusion) thereby forming various resin layers. The resin films were made from resin pellets manufactured by Kanebo Gohsen, Ltd. The resins were appropriately combined so as to give the compositions listed in Table 1, and made into monolayer or two-layer co-extruded or biaxially oriented films by an ordinary method. The films having a thickness of 25 μm were individually laminated to both sides of the substrates, thus making laminated steel sheets. The center line surface roughness (Ra) of the laminated films (resin layers) was controlled by changing the surface profile of the lamination roll, and the temperature and pressure of lamination.

Film Heat Lamination 1

Films made by biaxial drawing were bonded to heated steel sheets by heat lamination under a linear pressure of 80000 N/m at the lamination temperatures listed in Table 1 using a lamination roll having a center line surface roughness (Ra) of 0.6 μm, and then water-cooled in 7 seconds.

Film Heat Lamination 2

Non-oriented films were bonded to heated steel sheets by heat lamination under a linear pressure of 80000 N/m at the lamination temperatures listed in Table 1 using a lamination roll having a center line surface roughness (Ra) of 0.6 μm, and then water-cooled in 7 seconds.

Direct Extrusion

The resin pellets were kneaded and molten in an extruder, and extruded through a T die so as to coat a heated steel sheet on the run. Subsequently, the resin-coated metal sheet was cooled by passing between cooling rolls at 80° C., and then water-cooled. The lamination temperatures are listed in Table 1. The center line surface roughness (Ra) of the lamination roll was 0.6 μm, and the linear pressure was 80000 N/m.

The laminated steel sheets thus obtained were measured as follows for the crystallization temperature of the laminate films, plane orientation factor, center line surface roughness (Ra), and 60 degree glossiness. The results are listed in Table 1.

"Measurement of Crystallization Temperature"

The films peeled off from laminated metal sheets were heated in a differential scanning calorimeter (DSC) from 0° C. to 280° C. at a temperature rising rate of 10° C./minute, and the temperature of the exothermic peak (crystallization peak) between 100 to 200° C. in the DSC curve was used to evaluate the oriented state.

"Measurement of Plane Orientation Factor"

The refraction index was measured at 25° C. using an Abbe refractometer, the sodium D line as the light source, and methylene iodide as the contact liquid. The refraction index Nx in the film length direction, the refraction index Ny in the film width direction, and the refraction index Nz in the film thickness direction were determined, and the plane orientation factor Ns was calculated according to the following formula:

$$\text{Plane orientation factor }(Ns)=(Nx+Ny)/2-Nz$$

"Measurement of Center Line Surface Roughness (Ra)"

According to JIS-B0601, the surface roughness was measured using a surface roughness tester SE-30 manufactured by Kosaka Laboratory Ltd., at a cutoff value of 0.8 mm, and a measuring length of 2.4 mm. The surface roughness was measured at three points in the film length and width directions, and the average Ra value was recorded as the Ra value of the film.

"Measurement of 60 Degree Glossiness"

According to JIS-Z8741, the 60 degree glossiness was measured at a measuring angle of 60 using a portable gloss meter PG-1M manufactured by Nippon Denshoku Industries Co., Ltd. The surface roughness was measured at three points in the film length and width directions, and the average glossiness was recorded as the glossiness of the film.

TABLE 1

| Steel sheet sample No. | Polyester resin composition | | | | Film properties | | | | | |
| --- | --- | --- | --- | --- | --- | --- | --- | --- | --- | --- |
| | Resin composition | Copolymerization component content (mol %) | Melting point (° C.) | Lamination method | Lamination temperature (° C.) | Crystallization temperature (° C.) | Plane orientation factor | Surface roughness | 60 degree gloss | Note |
| A1 | Polyethylene terephthalate copolymerized with 6% isophthalic acid | 8 | 235 | Film thermo-compression bonding 2 | 230 | 147 | <0.01 | 0.25 | 95 | Example |
| A2 | Polyethylene terephthalate copolymerized with 12% isophthalic acid | 12 | 226 | Film thermo-compression bonding 1 | 235 | 148 | <0.01 | 0.81 | 52 | Example |
| A3 | Polyethylene terephthalate copolymerized with 12% isophthalic acid | 12 | 226 | Film thermo-compression bonding 1 | 232 | 142 | <0.01 | 0.76 | 54 | Example |

TABLE 1-continued

| Steel sheet sample No. | Polyester resin composition | | | | Film properties | | | | | Note |
|---|---|---|---|---|---|---|---|---|---|---|
| | Resin composition | Copolymerization component content (mol %) | Melting point (° C.) | Lamination method | Lamination temperature (° C.) | Crystallization temperature (° C.) | Plane orientation factor | Surface roughness | 60 degree gloss | |
| A4 | Polyethylene terephthalate copolymerized with 12% isophthalic acid | 12 | 226 | Film thermo-compression bonding 1 | 228 | 136 | <0.01 | 0.72 | 55 | Example |
| A5 | Polyethylene terephthalate copolymerized with 12% isophthalic acid | 12 | 226 | Film thermo-compression bonding 1 | 222 | 130 | <0.01 | 0.48 | 68 | Example |
| A6 | Polyethylene terephthalate copolymerized with 12% isophthalic acid | 12 | 226 | Film thermo-compression bonding 1 | 220 | 126 | 0.01 | 0.32 | 93 | Example |
| A7 | Polyethylene terephthalate copolymerized with 12% isophthalic acid | 12 | 226 | Film thermo-compression bonding 1 | 218 | 124 | 0.03 | 0.23 | 97 | Example |
| A8 | Polyethylene terephthalate copolymerized with 12% isophthalic acid | 12 | 228 | Direct extrusion | 220 | 152 | <0.01 | 0.23 | 95 | Example |
| A9 | Polyethylene terephthalate copolymerized with 18% isophthalic acid | 18 | 215 | Film thermo-compression bonding 1 | 215 | 138 | <0.01 | 0.45 | 65 | Example |
| A10 | Polyethylene terephthalate copolymerized with 5% isophthalic acid | 5 | 240 | Film thermo-compression bonding 1 | 235 | 125 | <0.01 | 0.23 | 98 | Example |
| A11 | Polyethylene terephthalate copolymerized with 12% isophthalic acid | 12 | 226 | Film thermo-compression bonding 1 | 237 | 149 | <0.01 | 1.4 | 30 | Example |
| A12 | Polyethylene terephthalate copolymerized with 12% isophthalic acid | 12 | 226 | Film thermo-compression bonding 1 | 216 | 118 | 0.05 | 0.11 | 123 | Comparative Example |
| A13 | Polyethylene terephthalate copolymerized with 12% isophthalic acid | 12 | 226 | Film thermo-compression bonding 2 | 200 | 152 | <0.01 | 0.14 | 115 | Comparative Example |
| A14 | Polyethylene terephthalate copolymerized with 12% isophthalic acid | 12 | 226 | Film thermo-compression bonding 1 | 240 | 152 | <0.01 | 1.9 | 25 | Comparative Example |

"Forming of can Body"

The various laminated steel sheet obtained as described above were formed into two-piece can bodies (final formed bodies) by the following procedure in accordance with the manufacturing process shown in FIG. 1. The medium forming (step C) and the final formed body (step D) were formed so as to give the shapes and strain levels listed in Table 2. The drawing in the step A was carried out in five steps, and the diametral reduction in the step D was carried out in seven steps. The heat treatment was carried out in the course of the steps A to D, wherein the can body was heated in an infrared heating furnace, and water-cooled after completion of the heat treatment. The timing of the heat treatment (strain level of the can body at the time of heat treatment) and heat treatment conditions are listed in Table 3.

Procedure of can Body Forming

1) Blanking (blank sheet diameter: 66 to 94 mm)
2) Drawing and ironing (step A)

A can body (intermediate formed body) having a radius r and a height h satisfying r/R: 0.27 to 0.34 and h/(R−r): 1.78 to 3.00 was produced through drawing in five steps. In order to produce an intended can body, ironing was also carried out appropriately. During or after the drawing, heat treatment was carried out at the strain level listed in Table 3.

3) Doming of can bottom (step B)

The can bottom was domed at a height of 6 mm.

4) Trimming (step C)

The upper edge of the can was trimmed by about 2 mm.

5) Diametral reduction of the upper portion of cylinder (step D)

The upper portion of the cylinder was subjected to diametral reduction. More specifically, the diametral reduction was carried out by a die neck method wherein the edge of the opening was pressed against a die having a tapered inside surface, thus producing the final can body having the shape listed in Table 2.

cut linearly along the circumferential direction at the position located 10 mm from the bottom in the can height direction. As a result of this, a specimen divided at the cut position into a bottom side section having a height of 10 mm in the can height direction, and the remnant was obtained. The 10-mm section was welded to a steel sheet having a width of 15 mm and a length of 60 mm, and the 60-mm steel sheet was pulled thereby peeling the film from the remnant by about 10 mm from the cut position. A 180 degree peel test was carried out, wherein the portion from which the film had been peeled and the 60-mm steel sheet were used as the tails to be grabbed. The minimum measurement of the peel strength was used as the index of the adhesion.

(Rating)

Less than 3N/15 mm: x

3N/15 mm or more and less than 4N/15 mm: Δ

4N/15 mm or more and less than 5N/15 mm: ○

5N/15 mm or more: ⊙

(2) Film Defects Evaluation

A seal having an opening with a diameter of 15 mm was stuck to a can body with its center at the position located 10 mm from the upper edge of the can so as to define the measurement area with a diameter of 15 mm. secondly, the film on the can surface was scratched with a file so as to pass a current through the steel sheet of the can body, and the area defined by the opening was immersed in an electrolytic

TABLE 2

| Can body shape | Blank diameter $R_0$ (mm) | Intermediate formed body (step C) | | | Final formed body (step D) | | | | | | Sheet |
|---|---|---|---|---|---|---|---|---|---|---|---|
| | | r (mm) | h (mm) | Blank r (mm) | $r_1$ (mm) | h (mm) | ha (mm) | hc (mm) | diameter $R^*$ (mm) | $r_1/R$ (mm) | h/(R − r) (mm) | thickness change** |
| B1 | 41.0 | 11.0 | 63.6 | 11.0 | 7.8 | 65.9 | 47.0 | 9.9 | 40.4 | 0.19 | 2.24 | 1.20 |
| B2 | 47.0 | 11.0 | 63.5 | 11.0 | 7.8 | 65.9 | 47.0 | 9.9 | 46.6 | 0.17 | 1.85 | 1.45 |
| B3 | 35.5 | 11.0 | 63.5 | 11.0 | 7.8 | 65.9 | 47.0 | 9.9 | 34.8 | 0.22 | 2.77 | 0.75 |
| B4 | 33.0 | 11.0 | 63.5 | 11.0 | 7.8 | 65.9 | 47.0 | 9.9 | 32.2 | 0.24 | 3.11 | 0.65 |

*Blank diameter R is calculated from the weight of the final formed body.
**Sheet thickness of the segment having the minimum sheet thickness/sheet thickness of blank sheet (both are steel sheet thickness)

In Table 2, h, r, $r_1$, ha, hc, and R of the final formed body (step D) are the height from the can bottom to the edge of the opening of the final formed body, the radius of the can body, the radius of the neck, the height of the straight wall of the final formed body having an unreduced diameter, the height of the tapered section, the height of the straight wall of the neck having a reduced diameter, and the radius of the circular blank before forming having the same weight as the final formed body, respectively. The radius R of the circular blank was determined as follows. The weight of the blank sheet before forming and the weight of the final formed body after trimming were measured, the radius of the blank sheet before forming having the same weight as the final formed body was determined on the basis of the measurements, and the radius was used as the radius R of the circular blank before forming having the same weight as the final formed body.

The can bodies thus obtained were examined for the processability of the resin layer and corrosion resistance. The results are listed in Table 3.

"Film Processability Test"

(1) Adhesion Test

The can body was cut into a generally rectangular piece along the can height direction so as to have a width of 15 mm in the circumferential direction, and only the steel sheet was solution (5% KCl solution) in a room at a temperature of 20° C. Thereafter, a voltage of 6.2 V was applied between the steel sheet and electrolytic solution, and the current value was measured and rated as follows.

(Rating)

More than 0.01 mA: x

More than 0.001 mA and 0.01 mA or less: Δ

More than 0.0001 mA and 0.001 mA or less: ○

0.0001 mA or less: ⊙

"Corrosion Resistance Evaluation"

The film on the can surface was scratched with a file so as to pass a current through the steel sheet of the can body, and then the can was filled with an electrolytic solution (1% NaCl solution) to the edge in a room at a temperature of 20° C. Thereafter, a voltage of 6.2 V was applied between the can body and electrolytic solution, and the current value was measured and rated as follows.

(Rating)

More than 0.1 mA: x

More than 0.01 mA and 0.1 mA or less: Δ

More than 0.001 mA and 0.01 mA or less: ○

0.001 mA or less: ⊙

TABLE 3

| Can body No. | Steel sheet sample No. | Melting point of Resin layer (° C.) | Strain level during heat treatment r1/R | Strain level during heat treatment h/(R − r) | Heat treatment condition Temperature (° C.) | Heat treatment condition Time (seconds) | Final shape of can body | Film processability Adhesion | Film defects | Corrosion resistance | Note |
|---|---|---|---|---|---|---|---|---|---|---|---|
| C1 | A3 | 226 | 0.27 | 2.16 | 215 | 30 | B1 | ○ | ◎ | ◎ | Example |
| C2 | A3 | 226 | 0.27 | 2.16 | 215 | 60 | B1 | ◎ | ◎ | ◎ | Example |
| C3 | A3 | 226 | 0.27 | 2.16 | 215 | 90 | B1 | ◎ | ◎ | ◎ | Example |
| C4 | A3 | 226 | 0.27 | 2.16 | 215 | 120 | B1 | ◎ | ◎ | ○ | Example |
| C5 | A3 | 226 | 0.27 | 2.16 | 230 | 60 | B1 | ◎ | ◎ | ○ | Example |
| C6 | A3 | 226 | 0.27 | 2.16 | 240 | 30 | B1 | ◎ | ○ | ○ | Example |
| C7 | A3 | 226 | 0.27 | 2.16 | 160 | 90 | B1 | ○ | ◎ | ◎ | Example |
| C8 | A3 | 226 | 0.27 | 2.16 | 120 | 60 | B1 | ○ | ○ | ○ | Example |
| C9 | A3 | 226 | 0.38 | 1.78 | 215 | 30 | B1 | ○ | ○ | ◎ | Example |
| C10 | A3 | 226 | 0.47 | 1.53 | 215 | 30 | B1 | ○ | ○ | ○ | Example |
| C11 | A3 | 226 | 0.24 | 1.78 | 215 | 30 | B2 | ◎ | ◎ | ◎ | Example |
| C12 | A3 | 226 | 0.18 | 2.24 | 215 | 30 | B2 | ○ | ○ | ◎ | Example |
| C13 | A3 | 226 | 0.32 | 2.67 | 215 | 30 | B3 | ○ | ◎ | ○ | Example |
| C14 | A3 | 226 | 0.50 | 2.30 | 215 | 30 | B3 | ○ | ○ | ◎ | Example |
| C15 | A3 | 226 | 0.50 | 0.15 | 215 | 30 | B3 | ○ | ○ | ○ | Example |
| C16 | A3 | 226 | 0.34 | 3.00 | 215 | 30 | B4 | ○ | ◎ | ○ | Example |
| C17 | A3 | 226 | 0.40 | 2.30 | 215 | 30 | B4 | ○ | ○ | ◎ | Example |
| C18 | A3 | 226 | 0.55 | 2.00 | 215 | 30 | B4 | ○ | ○ | ○ | Example |
| C19 | A1 | 235 | 0.27 | 2.16 | 220 | 30 | B1 | ○ | ◎ | ◎ | Example |
| C20 | A2 | 226 | 0.27 | 2.16 | 215 | 30 | B1 | ◎ | ◎ | ◎ | Example |
| C21 | A4 | 226 | 0.27 | 2.16 | 215 | 30 | B1 | ◎ | ○ | ◎ | Example |
| C22 | A5 | 226 | 0.27 | 2.16 | 215 | 30 | B1 | ◎ | ○ | ◎ | Example |
| C23 | A6 | 226 | 0.27 | 2.16 | 215 | 30 | B1 | ○ | ○ | ◎ | Example |
| C24 | A7 | 226 | 0.27 | 2.16 | 215 | 30 | B1 | ○ | ○ | ◎ | Example |
| C25 | A8 | 228 | 0.27 | 2.16 | 220 | 30 | B1 | ○ | ◎ | ○ | Example |
| C26 | A8 | 228 | 0.27 | 2.16 | 150 | 60 | B1 | ○ | ○ | ◎ | Example |
| C27 | A9 | 240 | 0.27 | 2.16 | 200 | 30 | B1 | ◎ | ○ | ○ | Example |
| C28 | A10 | 245 | 0.27 | 2.16 | 230 | 30 | B1 | ○ | ○ | ◎ | Example |
| C29 | A11 | 226 | 0.27 | 2.16 | 210 | 30 | B1 | ◎ | ○ | ◎ | Example |
| C30 | A12 | 226 | 0.27 | 2.16 | 210 | 30 | B1 | X | X | ○ | Comparative Example |
| C31 | A13 | 226 | 0.27 | 2.16 | 210 | 30 | B1 | Δ | Δ | ○ | Comparative Example |
| C32 | A14 | 226 | 0.27 | 2.16 | 210 | 30 | B1 | ○ | X | Δ | Comparative Example |

The results listed in Table 3 indicate that the can bodies of Examples C1 to C29 of the present invention were superior in the film processability and corrosion resistance.

On the other hand, Comparative Examples C30 to C32 were inferior in the processability and corrosion resistance, because their center line surface roughness was outside the range of the present invention.

The laminated steel sheet of the present invention is formed into a two-piece can body with a high strain level and no delamination or fracture of the resin layer. Accordingly, the present invention is suitable for cans highly strained by drawing, such as those for containing aerosols.

The invention claimed is:

1. A method for producing a two-piece can body, comprising:
   (i) providing a circular laminated steel sheet satisfying the following formulae:

$r_1 \leq r,$ $0.1 \leq r_1/R \leq 0.25,$ and $1.5 \leq h/(R-r) \leq 4$ wherein h is the height, r is the maximum radius and $r_1$ is the minimum radius of the two-piece can body, and R is the radius of the circular laminated steel sheet, the laminated steel sheet comprising a polyester resin layer on at least one side of the steel sheet, the surface of the polyester resin layer having a center line surface roughness Ra of 0.2 μm to 1.8 μm; and
   (ii) forming the can body by drawing the laminated steel sheet into a tube having a predetermined radius r of the can body, the can body having a top opening and a closed bottom,
   wherein the formed can body satisfies the following formulae:

$r_1 \leq r,$ $0.1 \leq r_1/R \leq 0.25,$ and $1.5 \leq h/(R-r) \leq 4;$ wherein the can body is subjected to heat treatment during the forming step so as to satisfy the following formulae:

$r_1 \leq r,$ $0.2 \leq r_1/R \leq 0.5,$ and $1.5 \leq h/(R-r) \leq 2.5.$

2. The method according to claim 1, wherein step (ii) comprises one-step drawing the laminated steel sheet.

3. The method according to claim 1, wherein step (ii) comprises multi-step drawing the laminated steel sheet.

4. The method according to claim 1, wherein step (ii) comprises drawn and ironed (DI) processing.

5. The method according to claim 1, further comprising (iii) inward doming the bottom of the formed can body.

6. The method according to claim 1, further comprising (iv) trimming the top opening of the formed can body.

7. The method according to claim 1, wherein an amount of steel trimmed from the formed body in step (iv) is 20% or less of R.

8. The method according to claim 1, further comprising (v) subjecting the top opening of the formed can body to diametrical reduction, thereby reducing the radius of the opening to a predetermined radius $r_1$ of the can body.

9. The method according to claim 8, wherein step (v) comprises one-step diametrical reduction of the top opening.

10. The method according to claim 8, wherein step (v) comprises multi-step diametrical reduction of the top opening.

11. The method according to claim 1, wherein the steel sheet is tin-free steel sheet comprising a metal chromium layer in a coating weight of 50 to 200 mg/m$^2$ and a chromium oxide layer in a coating weight of 3 to 30 mg/m$^2$, in terms of metal chromium.

12. The method according to claim 1, wherein the steel sheet is tinplate comprising a tin coating of 0.5 to 15 g/m$^2$.

13. The method according to claim 1, wherein the provided steel sheet has a thickness of 0.15 to 0.30 mm.

14. The method according to claim 1, wherein the surface of the polyester resin layer has a center line surface roughness Ra of 0.4 μm to 1.0 μm.

15. The method according to claim 1, wherein the surface of the polyester resin layer has 60 degree glossiness of 30 to 100.

16. The method according to claim 1, wherein the polyester resin comprises polyethylene terephthalate copolymerized with isophthalic acid.

17. The method according to claim 1, wherein the polyester resin layer has a plane orientation factor of 0.04 or less, and a crystallization temperature of 140° C. to 160° C.

18. The method according to claim 1, wherein the polyester resin layer has a thickness of 5 μm to 50 μm.

19. The method according to claim 1, wherein the heat treatment is carried out at a temperature of 150° C. to 220° C.

20. The method according to claim 19, wherein the can body is heated to a temperature of 170° C. or higher and not higher than the melting temperature of the polyester resin.

21. The method according to claim 1, wherein providing the laminated steel sheet comprises bonding a polyester resin film to the steel sheet by heat lamination under pressure using a lamination roll having a predetermined center line surface roughness (Ra) of 0.2 μm to 1.8 μm.

22. The method according to claim 1, wherein providing the laminated steel sheet comprises extruding a molten polyester resin through a T die so as to coat the heated steel sheet on the run, and subsequently cooling the coated steel sheet by passing between cooling rolls, and using a lamination roll having a predetermined center line surface roughness (Ra) of 0.2 μm to 1.8 μm.

* * * * *